United States Patent
Zeger et al.

(10) Patent No.: US 6,189,857 B1
(45) Date of Patent: Feb. 20, 2001

(54) FLUID-ACTUATED RAPID CLOSURE VALVE

(75) Inventors: Leroy Zeger, Passaic; Edward R. Promin, Newfoundland, both of NJ (US)

(73) Assignee: The United States of America as represented by the United States Department of Energy, Washington, DC (US)

( * ) Notice: Under 35 U.S.C. 154(b), the term of this patent shall be extended for 0 days.

(21) Appl. No.: 05/133,714

(22) Filed: Apr. 13, 1971

(51) Int. Cl.⁷ ................................. F16K 31/145
(52) U.S. Cl. ............................ 251/61.1; 251/5; 137/451; 137/355.18
(58) Field of Search ..................... 251/5, 61.1; 137/451, 137/355.18

(56) References Cited

U.S. PATENT DOCUMENTS 2,994,336 * 8/1961 Bryan ........................................ 251/5
3,159,373 * 12/1964 Kroffke ..................................... 251/5

* cited by examiner

*Primary Examiner*—Peter A. Nelson
(74) *Attorney, Agent, or Firm*—Emily G. Schneider; William R. Moser; Paul A. Gottlieb

(57) ABSTRACT

A fluid-actuated squeeze valve is provided for use where leak-tight operation and/or very rapid valve closure characteristics are required. The valve comprises an annular valve body with a generally cylindrical open-ended bore for receiving the frusto-conical end portions of two, axially aligned, opposed end plugs. An annular clearance is provided between the end portions and the bore wall for receiving an elastomeric sleeve. Each end plug is provided with an axially extending bore for passage of process fluid which communicates with angled passageways extending from the bore to the slant surface of a respective frusto-conical end portion. The smaller truncated end surfaces of the two opposed end portions are spaced apart axially to define a narrow gap therebetween. Fluid pressure is exerted through an access port in the valve body to actuate the valve by causing the elastomeric sleeve to press against the end portions. Means for operating the valve in response to system pressure parameters are described.

4 Claims, 2 Drawing Sheets

FLUID-ACTUATED RAPID CLOSURE VALVE

BACKGROUND OF THE INVENTION

The invention relates generally to valves, and more particularly to an improved fluid-actuated rapid closure squeeze valve. It was made in the course of, or under, a contract with the U. S. Atomic Energy Commission.

Valves made in accordance with the invention are especially intended for use in applications where extremely rapid and leak-tight valve operation is required. One such application is the provision of pressure surge protection in a gas centrifuge cascade where individual gas centrifuge machines are joined in parallel to form stages within a cascade. Failure of a single gas centrifuge machine within a stage could generate a pressure surge in the process gas which would cause additional machine failures in a domino fashion. Such an occurrence must be guarded against by valves capable of operating in a sufficiently rapid fashion so that the failed machine is isolated before the pressure wave which it generates can reach a gas header shared in common with other machines. Once activated, the valve must provide a continuing leak-tight seal to prevent atmospheric contamination of the process gas which is maintained at subatmospheric pressure within the cascade.

It is, accordingly, a general object of the invention to provide an improved valve capable of rapid closure and leak-tight operation.

Other objects of the invention will become apparent from an examination of the following description of the invention and the appended drawings.

SUMMARY OF THE INVENTION

In accordance with the invention, a fluid actuated squeeze valve is provided which is suitable for use where leak-tight operation and/ or very rapid valve closure characteristics are required. The valve comprises an annular valve body with a generally cylindrical open-ended bore for receiving the frusto-conical end portions of two, axially aligned, opposed end plugs. An annular clearance is provided between the end portions and the bore wall for receiving an elastomeric sleeve. Each end plug is provided with an axially extending bore for passage of process fluid which communicates with angled passageways extending from the bore to the slant surface of a respective frusto-conical end portion. The smaller truncated end surfaces of the two opposed end portions are spaced apart axially to define a narrow gap therebetween. Fluid pressure is exerted through an access port in the valve body by suitable pressure supplying means to actuate the valve by causing the elastomeric sleeve to press against the end portions. The resulting valve is simple in design, rapid operating, and extremely leak tight when actuated due to the existence therein of several seals in series which must all be penetrated before process gas can pass through the valve.

DESCRIPTION OF THE PREFERRED EMBODIMENT

Figure 2:
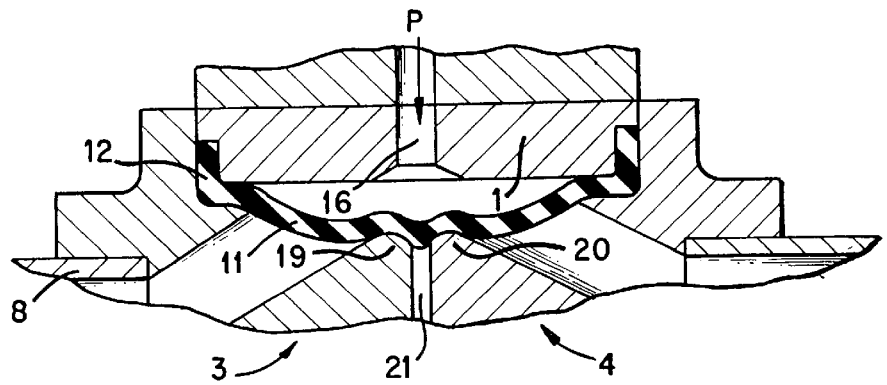
FIG. 2 is a fragmentary sectional view of the valve of FIG. 1 showing the valve in a closed position.

Referring now to the figures, initially to FIG. 1 where a sectional view of a valve made in accordance with the invention is illustrated, an annular valve body 1 has a centrally located, cylindrical bore 2 for receiving two opposed end plugs, hereinafter referred to as inlet plug 3 and outlet plug 4, of identical construction. Each end plug is secured to valve body 1 in any suitable manner such as bolts 5 passing through flanges 6. Inlet plug 3 is provided with an axially extending threaded inlet passage 7 for receiving an inlet conduit 8. A similar passage, designated outlet passage 9, is provided in outlet plug 4 for receiving outlet conduit 10. The direction of fluid flow could be reversed, however, with the inlet plug 3 serving as the outlet plug and vice versa, since the valve is symmetrical and operates equally well regardless of the direction of fluid flow therethrough.

An elastomeric sleeve 11, having upstanding flange portions 12 at its ends, is clamped between valve body 1 and end plugs 3 and 4 with its intermediate sleeve-like portion free to deflect radially within annular cavity 13. As shown in FIG. 1, sleeve 11 is in a position which permits flow through the valve. FIG. 2, which will be described more fully below, shows the valve in a closed position with sleeve 11 deflected radially inward against plugs 3 and 4.

Figure 4:
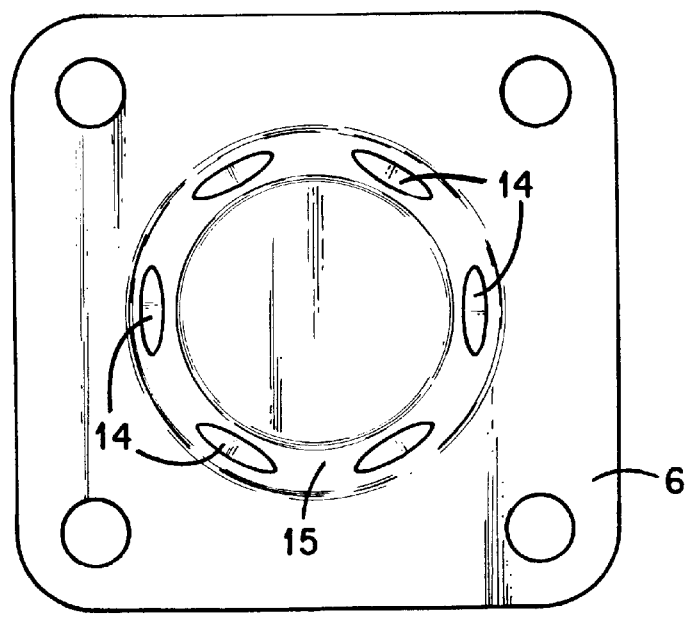
FIG. 4 is a second plan view of the end plug of FIG. 3 taken normal to the plane of FIG. 3.
Figure 3:
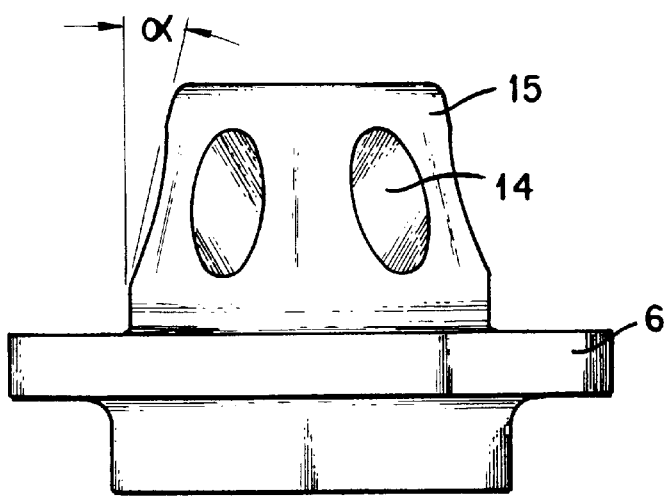
FIG. 3 is a plan view of an end plug as used in the valve of FIGS. 1 and 2.

The plan views of FIGS. 3 and 4 more clearly illustrate the frusto-conical shape of that portion of identical end plugs 3 and 4 which fits within bore 2 of valve body 1. As shown, a plurality of angled passageways 14 are spaced about the tapered surface 15 of each end plug. Tapered surfaces 15 are inclined with respect to the axes of end plugs 3 and 4 at an angle a which in the preferred embodiment is 12½ degrees. This angle should be selected to provide sufficient flow area between sleeve 11 and end plugs 3 and 4 while keeping the deflection of sleeve 11 required to close the valve to a minimum. Passageways 14, which may be inclined as shown or otherwise radially extending, extend inwardly to the respective axially extending inlet and outlet passages 7 and 9 of end plugs 3 and 4 as shown in FIG. 1.

Operation of the subject valve may be accomplished by connecting any suitable source of pressure with access port 16 in valve body 1. With the valve in an open position, process fluid from inlet conduit 8 flows through passageways 14 in inlet plug 3, along the annular passage 17 between elastomeric sleeve 11 and inlet and outlet plugs 3 and 4, through passageways 14 in outlet plug 4, and out through outlet conduit 10 as shown by the flow arrows in FIG. 1. The space 18 between bore 2 and sleeve 11 may be maintained under vacuum to reduce flow restriction to a minimum by flattening the sleeve against the wall of the core although any pressure in volume 18 which is less than that of the process fluid will permit flow to occur through the valve. By pressurizing volume 18 to a value greater than that of the process fluid, the pressure differential across sleeve 11 deflects it against end plugs 3 and 4 in the manner shown in FIG. 2. Sleeve 11 presses into passageways 14 forming seals along the rim defined by the intersections of passageways 14 and tapered surfaces 15. Additional seals are formed along rims 19 and 20 where sleeve 11 is forced into clearance 21 between the end plugs. A clearance 21 of about 0.125 has been found satisfactory in one sample valve.

Figure 1:
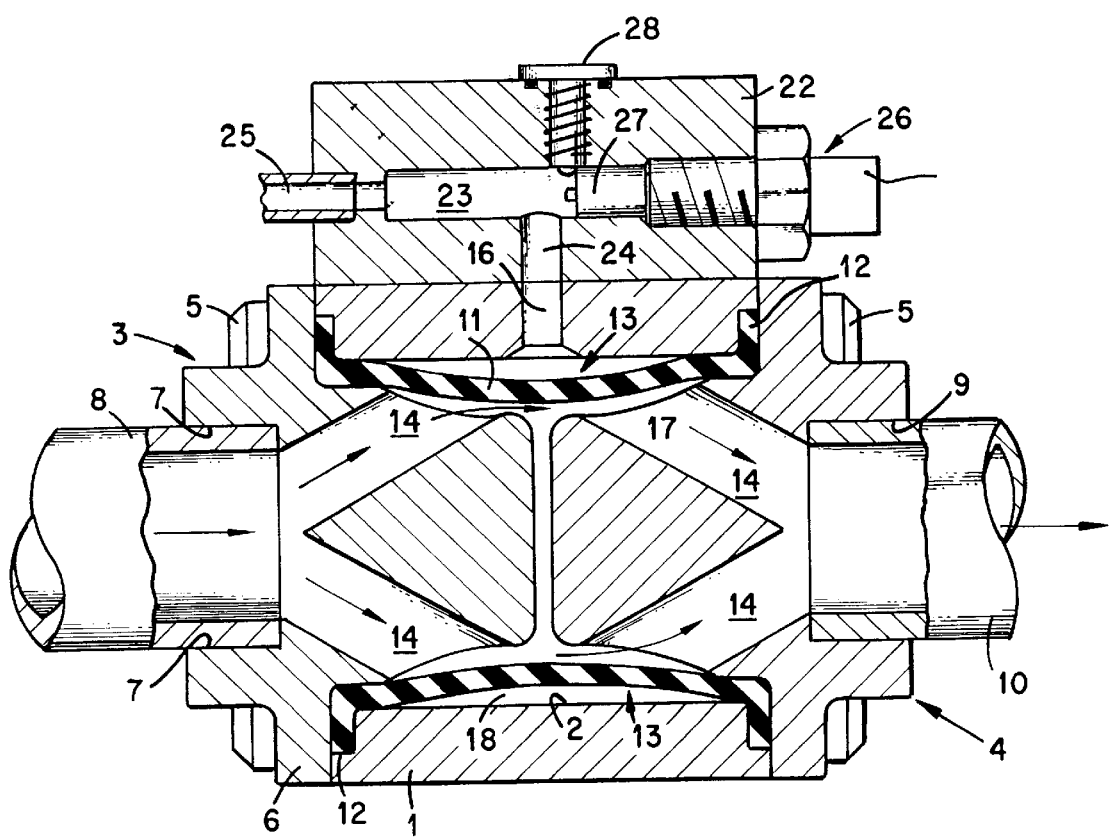
FIG. 1 is a sectional view of a valve made in accordance with the invention and showing the valve in an open position.

A valve operating mechanism is also shown in FIG. 1 comprising a housing 22 provided with intersecting passageways 23 and 24. Passageway 24 registers with access port 16. Passageway 23 is threaded at one end to receive control conduit 25 which may be connected to any suitable source of pressure and/or vacuum to provide routine control of the valve as a flow regulator. To provide extremely rapid and leak-tight valve closure, as required for surge protection for example, a pyrotechnic device 26 is fitted into the opposite end of passageway 23. A piston 27 is restrained by a spring loaded ball plunger 28 until firing of the pyrotechnic device propels it along passage 23 to seal control conduit 25. In addition to propelling piston 27, firing of the pyrotechnic device generates pressure which forces sleeve 11 against end plugs 3 and 4 as shown in FIG. 2, thereby closing the valve. Alternatively, air solenoid operators can be used to close the valve. Valve closure times of less than 10 milliseconds have been obtained using pyrotechnic devices and 35- to 50-millisecond closure times have been achieved using electrically energized pneumatic operators.

The above description of one embodiment of the invention is intended to illustrate the invention and should not be interpreted in a strictly limiting sense. For example, the number and arrangement of passageways 14 could be varied without departing from the scope of the invention. Also, it is apparent that the valve is useful as a flow regulator and can be used where neither extremely rapid closure times nor leak-tight operation is required even though it has those capabilities. Numerous operating schemes in addition to those representative schemes described will be apparent to those familiar with the valve art. It is intended, rather, that the invention be limited only by the scope of the appended claims.

What is claimed is:

1. A fluid-actuated rapid closure valve comprising:

(a) a valve body having a generally cylindrical open-ended bore and an access port in fluid communication with said bore;

(b) a pair of axially aligned, spaced apart, opposed end plugs secured to said valve body; said end plugs having frusto-conical inner end portions extending within respectively opposite ends of said bore, and outer end portions extending outside of said valve body to form an inlet and outlet for said valve; each of said end plugs having an axially extending passageway open at its outer end portion and terminating within its inner end portion, and at least one radially extending passageway communicating between said axially extending passageway and the conical surface of said frusto-conical inner end portion; and (c) an annular elastomeric sleeve disposed within said bore in said valve body and surrounding said inner end portions of said end plugs; the space between said sleeve and the wall of said bore forming an expansible pressure chamber to which fluid under pressure is applied through said access port for controlling the expansion and contraction of said sleeve.

2. A valve according to claim 1 wherein a plurality of radially extending passageways are provided within each of said end plugs, said passageways being equiangularly spaced about the axis of each of said end plugs.

3. A valve according to claim 1 wherein said conical surface of said frusto-conical end portion is inclined at about 12½ degrees with respect to the axis of said end plug.

4. A valve according to claim 1 wherein said end plugs are similar in size and configuration.

* * * * *